United States Patent Office 3,528,828
Patented Sept. 15, 1970

3,528,828
GLASS, CERAMICS, AND METHOD
William Earl Smith, Sylvania Township, Lucas County, Ohio, assignor to Owens-Illinois, Inc., a corporation of Ohio
No Drawing. Filed May 28, 1964, Ser. No. 371,089
Int. Cl. C04b 35/00, 35/16, 35/46
U.S. Cl. 106—39                                          4 Claims

ABSTRACT OF THE DISCLOSURE

Thermally crystallizable glasses with $$Na_2O \cdot Al_2O_3 \cdot SiO_2 \cdot TiO_2$$

system are used to prepare high expansion nepheline glass-ceramic bodies.

---

This invention relates to a method of making high expansion ceramic bodies by crystallization of glasses in the system $Na_2O \cdot Al_2O_3 \cdot SiO_2 \cdot TiO_2$, and to the ceramic bodies and articles so produced. In another aspect, the invention relates to thermally crystallizable glasses useful in said method.

In U.S. Pat. 2,920,971 to S. D. Stookey, it is disclosed that a large variety of glasses containing $TiO_2$ can be crystallized to ceramic products. However, it is specifically stated that the process is not applicable to glasses containing more than 10 weight percent sodium oxide.

In British Pat. 869,328, assigned to the same assignee as U.S. Pat. 2,920,971, it is taught that $TiO_2$ will not cause glasses of the system $Na_2O \cdot Al_2O_3 \cdot SiO_2$ to crystallize to useful products, such glasses containing between 7 and 34 molecular percent $Na_2O$. However, the British patent goes on to state that such compositions will properly crystallize if $TiO_2$ is used in combination with certain percentages of MgO, CdO, MnO, CoO, ZnO, FeO, or NiO. It is further set forth that the absolute minimum amount of these divalent metal oxide constituents is at least 1.9 mole percent in excess of the total moles of $SiO_2+Al_2O_3+Na_2O+CaO+K_2O$ in the glass composition.

It is an object of the present invention to provide a method for making an at least partly crystalline ceramic body by in situ crystallization of a glass containing as the sole essential components silica, alumina, soda and titania.

It is a further object of the invention to provide ceramic bodies and articles made by this process. A further object is to provide new and useful thermally crystallizable glasses.

Other objects, as well as aspects and advantages, of the present invention will become apparent from a study of this specification.

According to the present invention, a narrow range of glass compositions has been found, containing as the sole essential constituents $SiO_2$, $Al_2O_3$, $Na_2O$, $TiO_2$ and optionally containing $K_2O$, which can be thermally treated to cause in situ crystallization to form substantially homogeneous crystalline ceramic bodies containing a multitude of randomly dispersed crystals.

The glasses of the present invention contain $SiO_2$, $Al_2O_3$, $Na_2O$ and $TiO_2$ as the sole essential ingredients and can contain $K_2O$ in small amounts as an optional component of the basic composition. Weight percentage ranges of such compositions are shown below in Table I:

TABLE I

| Component: | Percent |
|---|---|
| $SiO_2$ | 44–52 |
| $Al_2O_3$ | 22–29 |
| $Na_2O$ | 15–22 |
| $TiO_2$ | 6–12 |
| $K_2O$ | 0–3 |
| $SiO_2+Al_2O_3$ | 69–76 |
| $Na_2O+K_2O$ | 17–22 | where the weight ratio of $SiO_2$ to $(Na_2O+K_2O)$ is from 2.1 to 3, and the mole ratio of $(Na_2O+K_2O)$ to $Al_2O_3$ is at least 1.02. The usually preferred $Na_2O$ range is 16–21 weight percent.

According to the method of the invention, a glass of the invention is melted and is thereafter formed by conventional means such as press molding, casting, blow molding, tube drawing, or the like. The crystalline ceramics of the present invention are especially useful as tableware, and such objects as plates, cups and tea pots are usually made by pressing in a mold or by blow molding techniques.

In any event, the method of the invention comprises treating the formed glass object which have been cooled down to about its annealing point or lower, in an initial low temperature heat treatment range to form many nuclei or crystallites, and thereafter heating at a higher temperature to complete the crystallization to the desired degree. The optimum heat treatment schedule depends, as will be understood, on the particular glass composition and its tendency to form nuclei, and the rate of formation of nuclei and the rate of crystallization. Therefore, it is not possible to specify a heat treatment schedule that will be common to all the glasses of the invention.

However, it is usually preferred that the first-mentioned low temperature heat treatment be in a range of temperatures which promotes a high rate of formation of nuclei or crystallites, wherein "nuclei" are defined as submicroscopic precursors of crystalline species or as a finely dispersed submicroscopic immiscible glassy phase. The mechanism of crystal initiation for the present glasses is not definitely known, nor is it known whether the first phase that separates during the crystallization heat treatment schedule is an immiscible glassy phase or is a separate crystallite or crystalline phase. Also, it is difficut to measure directly the range of temperatures in which the higher rates of nuclei formation occur, or in other words, where the optimum temperature range for the initial heat treatment is to be located. However, this temperature range usually is from the annealing point of the glass to 250° F. above the annealing point. The annealing point, as defined herein, can be determined by ASTM designations C336–54T, with the testing apparatus being calibrated using fibers of standard glasses having known annealing and strain points as specified and published by the National Bureau of Standards.

While the best temperature range for maximum nuclei formation is difficult to measure directly, the optimum initial low temperature heat treatment range can be empirically determined employing small droplets of the glass and a micro-furnace capable of very rapid temperature change and accurate temperature control. A droplet of the glass, cooled to below the annealing point temperature, can be rapidly heated in the micro-furnace to a specific temperature between the annealing point and 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any event, as an example, a droplet of the glass can be heated for, say, 15 minutes at 60° F. above the annealing point temperature. Thereafter the droplet of glass in the micro-furnace can be very rapidly heated to a predetermined crystallization temperature, for instance, within the range 1750–1900° F., and held at such predetermined temperature for a specific length of time, for instance, one-half hour. This process can be repeated, using the same length of time of initial and final heating and the same temperature of final heating, but using different initial heating temperatures, say 40°, 80°, 100°, and 120° F. above the annealing point temperature. Thereafter by microscopic examination, one can determine which initial heat treatments resulted in formation of the most and smallest crystals, and thus determine the approximate temperature range where a maximum number of crystallization centers are formed. Thereafter, an optimum heat treatment schedule can be worked out by varying the length of time in the initial heat treatment range that appears to be optimum and by varying time and temperatures of heating in the final crystallization heat treatment range. Properties such as the fineness of the crystals and the strength of samples treated according to various temperature schedules can be determined as an aid in picking an optimum heat treatment schedule for the properties desired.

The process of the invention thus usually comprises heat treating the formed article in an optimum initial temperature range between the annealing point and 250° F. above the annealing point for a time of at least ½ hour, usually at least 1 hour, and thereafter heat treating in a higher crystallization temperature range. The time of initial heat treatment in the range from the annealing point to 250° F. above the annealing point has no upper limit; usually it is not more than 5 or 6 hours, but longer times are not in the least harmful and merely increase the cost of processing. The crystallization heat treatment stage is effected at higher temperatures in the range from about 1700°–1950° F., more usually in the range from 1750–1900° F., with a sufficient length of time of heating in the high temperature range to effect in situ crystallization to at least the extent that the resulting glass-ceramic product, after cooling to room temperature and reheating, will not substantially deform under its own weight when held for one hour at a temperature 400° F. above the annealing point of the original glass. Thus, a rod, 7" long and about ¼" in diameter supported near each end by knife edges spaced 6" apart will not deform or sag at the center as much as ⅛". Obviously, a degree of crystallization that passes this test represents a rather highly crystalline material, since glass or glass with only 5–10% crystalline material would obviously deform badly when held at a temperature so far above its annealing point. However, it is not possible to determine the exact relative amounts of crystallize and vitreous material in such densely crystallized materials as are produced by the present invention. Generally, times of heating in the temperature range of 1700 to 1950 are from 15 minutes to 6 hours, usually from ½ to 4 hours.

In any event, the overall heat treatment chosen, that is, the initial or nucleation heat treatment and the crystallization heat treatment, effected at the higher temperature, results in an at least partially crystalline ceramic body whose entire interior contains a multitude of randomly oriented, substantially homogeneously dispersed crystals, essentially all of which crystals are in their largest lineal dimension less than 30 microns across. The products are densely crystallized, hard, and non-porous.

As will be understood, when going from the initial or nucleation heat treatment temperature to the higher crystallization temperature, it is usually preferred to proceed slowly enough, or to stop at intermediate plateaus long enough, to effect appreciable crystallization in the intermediate temperature range, at least to such a degree that a rigid crystalline network is formed that prevents the article from slumping. Of course, in heat treating articles such as flat plates that can be cast in a mold and heat treated in the mold, the slumping problem is not important and not as much care need be exercised.

Although the specific examples show several plateaus of heat treatment temperatures, the entire heat treatment can be effected using slowly and continuously rising temperatures, and it is often desirable to employ different heating rates at various parts of the process. For instance, in the nucleation heat treatment temperature range the heating rate is usually slower than when going from this lower temperature range to the final crystallization temperature range.

As determined by X-ray powder diffraction measurements, the products of the crystallization step of the invention contain nepheline or a nepheline-like crystalline phase as the major crystalline phase, as shown by X-ray diffraction techniques. In other words, the nepheline or nepheline-like crystalline phase is present in the ceramic product in much larger volume than any other crystalline phase, as determined by X-ray powder diffraction data.

The glasses and ceramics of the invention consist essentially of the 4 or 5 components noted in Table I, but small amounts of other compatible inorganic components such as inorganic oxides and halides can be present, so long as they do not materially affect or change the basic and novel characteristics of the glasses and crystalline ceramics of the invention; with the proviso that (1) the amount of FeO, ZnO, MgO, CdO, MnO, CoO or NiO present in my glasses is limited to zero to 1.7 mole per cent of the total moles of $(SiO_2+Al_2O_3+Na_2O+K_2O)$ in my glass compositions, (2) the amount of chromium oxide expressed as $Cr_2O_3$ is limited to zero to less than 0.06 mole percent of the total moles of

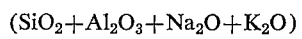

in my glass compositions, and (3) the amount of BaO is limited to zero to 2 weight percent of my total glass composition when the $Al_2O_3$ content thereof is less than 27 weight percent and is limited to less than 0.5 weight percent of my total glass composition when the $Al_2O_3$ content thereof is in the range from 27 to 29 weight percent, contrary to the respective teachings of British Pat. 869,328 and Belgian Pat. 635,296.

When components not mentioned in Table I are present in small amounts in glasses and ceramics of the present invention, such compositions still contain the components set forth in Table I in the percentage ranges listed in Table I.

Thus, the present new ceramics and their method of production are based on new glass compositions containing $SiO_2$, $Al_2O_3$, $Na_2O$ and $TiO_2$ as the sole essential constituents and optionally $K_2O$, and the use of other components, including the nine metal oxides last discussed, is unnecessary to obtain proper thermal in situ crystallization to ceramic products of the invention. The coloring oxides are not desirable in any appreciable amounts where white products are desired. No proportion of FeO, ZnO, MgO, CdO, MnO, CoO and NiO is necessary at all to obtain the products of the invention; however, these components can be used in amounts that do not materially change the basic and novel characteristics of the glasses and ceramics of this invention, but in any event such amounts are limited herein to zero to 1.7 mole percent

TABLE III

| | Example Number | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 45 | 47 | 46 | 49 | 48 | 50 | 47 | 48 | 49 | 50 | 47 | 46 |
| $Al_2O_3$ | 27 | 25 | 26 | 23 | 24 | 22 | 26 | 26 | 26 | 26 | 26 | 26 |
| $Na_2O$ | 18 | 18 | 18 | 18 | 18 | 18 | 18 | 18 | 18 | 18 | 19 | 20 |
| $TiO_2$ | 10 | 10 | 10 | 10 | 10 | 10 | 9 | 8 | 7 | 6 | 8 | 8 |
| Log 4, °F.[1] | 2,210 | 2,210 | 2,145 | 2,190 | 2,170 | 2,150 | 2,230 | 2,230 | 2,250 | 2,290 | 2,220 | 2,130 |
| Glass liquidus | 2,260 | 2,185 | | 2,260 | 2,245 | 2,185 | 2,245 | 2,260 | 2,195 | 2,235 | 2,290 | 2,320 |
| Heat treatment (Hrs./°F.) | 1/1,300 2/1,450 1/1,900 | 1/1,300 1/1,350 2/1,450 1/1,900 | 2/1,350 1/1,400 1/1,450 1/1,800 | 2/1,300 2/1,450 1/1,900 | 2/1,300 1/1,450 1/1,500 1/1,800 | 2/1,350 1/1,450 1/1,500 1/1,800 | 2/1,300 1/1,450 1/1,500 1/1,800 | 2/1,300 1/1,450 1/1,500 1/1,800 | 2/1,300 1/1,450 1/1,500 1/1,800 | 2/1,400 1/1,450 1/1,500 1/1,850 | 2/1,350 1/1,450 1/1,500 1/1,800 | 2/1,400 1/1,450 1/1,500 1/1,800 |
| A.P., °F.[2] | | | | | | | | 1,265 | | | | |
| MR, p.s.i.[3] | | | 19,800 | | | | | 23,900 | | 14,200 | | |
| Color | White | White | White | Pale yellow | White | White | White | White | White | White | White | White |
| $\alpha \times 10^7$ [4] | | | | 99 | | | | | | | | |

| | Example Number | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| $SiO_2$ | 47.5 | 47.5 | 46.8 | 47.3 | 47.2 | 47.3 | 46.9 | 47 | 47 | 47 | 44.6 | 47.2 |
| $Al_2O_3$ | 25.8 | 25.9 | 25.6 | 25.9 | 25.8 | 25.8 | 25.6 | 26 | 26 | 26 | 26.8 | 25.6 |
| $Na_2O$ | 18.1 | 18 | 17.9 | 17.9 | 18 | 18 | 17.9 | 18 | 18 | 18 | 17.9 | 17.9 |
| $TiO_2$ | 7.3 | 8 | 8 | 8 | 8 | 8 | 8 | 8.4 | 7.9 | 7.7 | 10.7 | 8 |
| | $K_2O$-1.3 | CaO-0.7 | CdO-1.7 | FeO-0.9 | NiO-1 | MnO-1 | ZnO-1.6 | BaO-0.6 | BaO-1.1 | BaO-0.6 MgO-0.7 | | CoO-1.3 |
| Log 4, °F. | 2,235 | 2,230 | 2,230 | 2,210 | 2,140 | 2,185 | 2,210 | 2,195 | 2,215 | 2,220 | 2,195 | 2,110 |
| Glass liquidus | 2,230 | 2,220 | 2,295 | 2,220 | 2,260 | 2,220 | 2,220 | 2,250 | 2,250 | 2,250 | | 2,200 |
| Heat treatment (Hrs./°F.) | 2/1,400 1/1,450 1/1,500 1/1,800 | 2/1,350 1/1,450 1/1,500 1/1,800 | 2/1,350 1/1,450 1/1,500 1/1,800 | 2/1,400 1/1,450 1/1,500 1/1,800 | 2/1,400 1/1,450 1/1,500 1/1,800 | 2/1,350 1/1,450 1/1,500 1/1,800 | 2/1,400 1/1,450 1/1,500 1/1,800 | 2/1,400 1/1,450 1/1,500 1/1,800 | 2/1,400 1/1,450 1/1,500 1/1,800 | 1/1,350 1/1,450 1/1,500 1/1,800 | 1/1,250 1/1,350 1/1,900 | 1/1,300 1/1,350 1/1,400–1/1,500 1/1,450–1/1,950 |
| MR, p.s.i. | | | | | | | | | | | 24,600 | |
| Color | White | White | White | Grey | Pale Green | Brown | White | White | White | Grey White | White | Green |
| $\alpha \times 10^7$ | | | | | | | | | | | 93 | |

[1] Temperature at which the logarithm of the viscosity in poises is 4.
[2] Annealing point.
[3] Modulus of rupture.
[4] Coefficient of expansion of the crystallized product.

The tested flexural strength of the crystallized material was determined using crystallized cane samples, usually of about 0.20 inch in diameter, and in all cases from 0.15 to 0.5 inch in diameter. The modulus of rupture tests were made using a Tinuis-Olsen testing machine. This machine applies a measured load through a single knife edge to the center of a 4" long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dial micrometer calibrated in inches and equipped with a bar contact instead of a point contact is used to measure maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{load (lbs.)} \times 8 \times \text{span (in.)}}{(D_1^2 \times D_2)\pi}$$

Each value reported in Table III is the average of a number of cane samples so tested.

It is believed that the crystalline ceramic products of the invention, even the very highly crystallized products, contain a residual glassy phase because the products of the invention have zero porosity. However, because of time limitations this point was investigated for only a few of the crystalline ceramic products made. It is believed, however, that the "crystalline ceramic" product claims of the invention are adequately defined without specific reference to a residual glassy matrix, which undoubtedly does exist in all such claimed products of the invention.

As will be evident to those skilled in the art, modifications of this invention can be made or followed in the light of the foregoing disclosure without departing from the spirit and scope of the disclosure or from the scope of the claims.

I claim:

1. A non-porous, densely crystalline ceramic article containing a multitude of substantially homogeneously dispersed crystals, essentially all of which crystals are in their largest lineal dimension less than 30 microns across, said ceramic article having been formed from a glass article by thermal in situ crystallization, said glass being a thermally crystallizable glass containing $SiO_2$, $Al_2O_3$, $Na_2O$ and $TiO_2$ as the sole essential constituents and optionally containing $K_2O$ as a fifth constituent, said constituents being present in the glass in the following weight percent ranges: $SiO_2$ 44–52, $Al_2O_3$ 22–29, $Na_2O$ 15–22, $TiO_2$ 6–12, $K_2O$ 0–3, ($SiO_2+Al_2O_3$) 69–76, and ($Na_2O+K_2O$) 17–22, the weight ratio of $SiO_2$ to ($Na_2O+K_2O$) being from 2.1 to 3, and the molecular ratio of ($Na_2O+K_2O$) to $Al_2O_3$ being at least 1.02 said glass also optionally containing one or more constituents selected from the group consisting of (1) 0 to 1.7 mole percent of the total moles of ($SiO_2+Al_2O_3+Na_2O+K_2O$) of at least one oxide selected from the group consisting of FeO, ZnO, MgO, CdO, MnO, CoO and NiO, (2) chromium oxide, expressed as $Cr_2O_3$, in an amount from 0 to <0.06 mole percent of the total moles of $$(SiO_2+Al_2O_3+Na_2O+K_2O)$$

and (3) BaO present in the total glass composition in an amount (a) from 0 to 2 weight percent thereof when the glass composition contains less than 27 weight percent $Al_2O_3$ and (b) from 0 to <0.5 percent of the total glass composition when the glass composition contains as much as 27 weight percent $Al_2O_3$.

2. A thermally crystallizable glass consisting essentially of $SiO_2$, $Al_2O_3$, $Na_2O$ and $TiO_2$ as the sole essential constituents necessary for the thermal crystallization and optionally containing $K_2O$ as a further constituent, said constituents being present in the glass in the following weight percentage ranges: $SiO_2$ 44–52, $Al_2O_3$ 22–29, $Na_2O$ 15–22, $TiO_2$ 6–12, $K_2O$ 0–3 ($SiO_2+Al_2O_3$) 69–76, and ($Na_2O+K_2O$) 17–22, the weight ratio of $SiO_2$ to ($Na_2O+K_2O$) being from 2.1 to 3, and the molecular ratio of ($Na_2O+K_2O$) to $Al_2O_3$ being at least 1.02, said of the total moles of ($SiO_2$+$Al_2O_3$+$Na_2O$+$K_2O$) in any given composition of the invention. Usually such amounts are less than 1.5 mole percent on this basis, when these divalent oxides are used at all. These limits apply to each individual oxide and to the total moles of a mixture of two or more of such oxides. Such components can be useful in the present compositions in these amounts to adjust glass working properties or to give colored products, but they are not usually used. Chromium oxide, expressed as $Cr_2O_3$, can be present in the very small amounts previously cited to tint or color the product, if desired.

BaO is an optional component in the present glasses and ceramics, but it is also not needed at all. However, BaO can be employed in the small amounts indicated to adjust working properties of the glasses, for instance.

As stated, the glasses and ceramics of the present invention contain the four essential constituents of Table I and require no other components at all. As noted, extensive work evidenced by the cited British patent and by Belgian Patent 635,296 has led others to conclude that $Cr_3O_3$, FeO, ZnO, MgO, CdO, MnO, CoO, NiO or BaO must be present in critical amounts to obtain a useful ceramic product. The disclosure of the Belgian patent referred to indicates that a critical lower limit of 28 weight percent alumina is necessary together with at least 1 weight percent BaO, as well as specified amounts of $SiO_2$, $Na_2O$ and $TiO_2$.

In spite of the teachings of the foregoing patents I have discovered a narrow range of compositions that have good glass working properties and can be thermally crystallized to at least partially crystalline ceramic products that are strong and fine-grained. My glasses require none of the special ingredients referred to in the British and Belgian patents.

Especially critical in the glass compositions of the present invention is the stated mole ratio of ($Na_2O$+$K_2O$) to $Al_2O$. When the ratio falls much below the value of 1.02, only coarsely crystalline, weak products are obtained, while the ceramic products of the invention have essentially all of their crystals less than 30 microns across in their largest lineal dimension and are strong and nonporous.

In general about 6 percent or more of $TiO_2$ is needed in the composition to obtain satisfactory crystallization. It is a feature of the glasses of the invention that they are sufficiently stable that they can be formed into shapes or articles in commercial automatic forming machinery without devitrification during forming. With $TiO_2$ contents much above 12 percent, the glasses become increasingly unstable, and therefore the upper limit of 12 percent is dictated by this factor.

While the glasses and ceramics of the invention have the range of compositions set forth hereinbefore, experience has shown that a now preferred range of glass compositions is that which consists essentially of the following components, present in the glass in the following weight percentages of the glass composition:

TABLE II

| Component: | Weight percent |
|---|---|
| $SiO_2$ | 44–52 |
| $Al_2O_3$ | 22–28 |
| $Na_2O$ | 16–21 |
| $TiO_2$ | 7–10 |
| $K_2O$ | 0–3 |
| $SiO_2$+$Al_2O_3$ | 70–76 |
| $Na_2O$+$K_2O$ | 17–21 | where the weight ratio of $SiO_2$ to ($Na_2O$+$K_2O$) is from 2.25 to 3, and the mole ratio of ($Na_2O$+$K_2O$) to $Al_2O_3$ is at least 1.02. In general, such glasses have the best working properties coupled with the good thermal crystallization properties, and resulting superior ceramic products.

The glasses of the invention can be melted in the normal manner in gas-fired furnaces, preferably using slightly oxidizing conditions, or in electric furnaces. Electric boosting can be provided in gas fired furnaces where desired. In the laboratory platinum crucibles can be used. In larger furnaces high quality refractories are employed, such as high-alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition may be necessary to account for the alumina from the refractory.

In a typical example of the method of the invention, flint sand, high purity alumina, high purity rutile and C.P. grade sodium carbonate were melted to a glass in a platinum crucible in a gas-fired furnace using slightly oxidizing conditions. Melting time was 22 hours at 2800° F., with mechanical stirring. A number of rods were pulled from the melt and thermally crystallized after cooling, using the following heat treatment schedule.

| ° F.: | Hours |
|---|---|
| 1350 | 2 |
| 1450 | 1 |
| 1500 | 1 |
| 1800 | 1 |

The rods were slowly cooled in the furnace by simply shutting off the power. The average abraded modulus of rupture value was 20,500 p.s.i.

The analyzed composition of the glass in weight percent was 48.1 $SiO_2$, 26.4 $Al_2O_3$, 17.5 $Na_2O$ and 8 $TiO_2$. Its liquidus temperature was about 2215° F. and its annealing point was about 1200° F.

The following Table III sets forth exemplary compositions of glasses and ceramics of the invention, which were melted in a manner similar to the preceding example. The compositions were computed in weight percent on the oxide basis from their batch components. While there is a slight loss of sodium oxide under some conditions during melting of the glasses, analytical data has shown that the losses are low, and it is believed that the batch compositions are sufficiently accurate for purposes of illustration of the invention.

As will be seen from the table, the physical properties of only a few of the crystallized compositions were actually measured, but all of the compositions and ceramic products are illustrative of compositions and ceramic products fulfilling the standards set forth in this specification, as determined by various tests, such as hand breaking, visual examination and microscopic inspection. The annealing points, where shown, are only approximates since they were not determined by the precise ASTM method. The liquidus temperatures shown in Table III were quite carefully determined by a fairly precise method employing special platinum boats in a gradient furnace. However, even these temperatures may also in some cases not be entirely accurate since they were not determined by very precise quenching and melting methods employed for the most careful phase diagram work. Similarly, the viscosity temperatures were carefully determined, but in most cases the log 4 viscosity temperatures in Table III were determined by extrapolation from viscosities measured at higher temperatures. It is too time consuming to attempt to adjust the temperature until it is precisely at the temperature where the viscosity is exactly 10,000 poises. However, the viscosities and other measured properties are reported so that those persons skilled in the art reading the specification will have a better understanding of the working properties of the glasses of the present invention.

glass also optionally containing one or more constituents selected from the group consisting of (1) 0 to 1.7 mole percent of the total moles of $(SiO_2+Al_2O_3+Na_2O+K_2O)$ of at least one oxide selected from the group consisting of FeO, ZnO, MgO, CdO, MnO, CoO and NiO, (2) chromium oxide, expressed as $Cr_2O_3$, in an amount from 0 to <0.06 mole percent of the total moles of $$(SiO_2+Al_2O_3+Na_2O+K_2O)$$

and (3) BaO present in the total glass composition in an amount (a) from 0 to 2 weight percent thereof when the glass composition contains less than 27 weight percent $Al_2O_3$ and (b) from 0 to <0.5 percent of the total glass composition when the glass composition contains as much as 27 weight percent $Al_2O_3$.

3. A method for making a densely crystalline, nonporous ceramic article which comprises making a thermally crystallizable glass melt containing $SiO_2$, $Al_2O_3$, $Na_2O$ and $TiO_2$ as the sole essential constituents and optionally containing $K_2O$ as a fifth constituent, said constituents being present in the glass in the following weight percent ranges: $SiO_2$ 44–52, $Al_2O_3$ 22–29, $Na_2O$ 15–22, $TiO_2$ 6–12, $K_2O$ 0–3, $(SiO_2+Al_2O_3)$ 69–76, and $(Na_2O+K_2O)$ 17–22, the weight ratio of $SiO_2$ to $(Na_2O+K_2O)$ being from 2.1 to 3, and the molecular ratio of $(Na_2O+K_2O)$ to $Al_2O_3$ being at least 1.02, said glass also optionally containing one or more constituents selected from the group consisting of (1) 0 to 1.7 mole percent of the total moles of $(SiO_2+Al_2O_3+Na_2O+K_2O)$ of at least one oxide selected from the group consisting of FeO, ZnO, MgO, CdO, MnO, CoO, and NiO, (2) chromium oxide, expressed as $Cr_2O_3$, in an amount from 0 to <0.06 mole percent of the total moles of $$(SiO_2+Al_2O_3+Na_2O+K_2O)$$

and (3) BaO present in the total glass composition in an amount (a) from 0 to 2 weight percent thereof when the glass composition contains less than 27 weight percent $Al_2O_3$ and (b) from 0 to <0.5 percent of the total glass composition when the glass composition contains as much as 27 weight percent $Al_2O_3$; forming a glass article of predetermined size and shape from said glass melt; and thereafter thermally crystallizing said article, by in situ crystallization, to a ceramic product containing a multitude of substantially homogeneously dispersed crystals, essentially all of which crystals are in their largest lineal dimension less than 20 microns across.

4. A thermally crystallizable glass consisting essentially of $SiO_2$, $Al_2O_3$, $Na_2O$ and $TiO_2$ as the sole essential constituents necessary for the thermal crystallization and optionally containing $K_2O$ as a further constituent, said constituents being present in the glass in the following weight percentage ranges: $SiO_2$ 44–52, $Al_2O_3$ 22–28, $Na_2O$ 16–21, $TiO_2$ 6–12, $K_2O$ 0–3 $(SiO_2+Al_2O_3)$ 70–76, and $(Na_2O+K_2O)$ 17–21, the weight ratio of $SiO_2$ to $(Na_2O+K_2O)$ being from 2.25 to 3, and the molecular ratio of $(Na_2O+K_2O)$ to $Al_2O_3$ being at least 1.02, said glass also optionally containing one or more constituents selected from the group consisting of (1) 0 to 1.7 mole percent of the total moles of $(SiO_2+Al_2O_3+Na_2O+K_2O)$ of at least one oxide selected from the group consisting of FeO, ZnO, MgO, CdO, MnO, CoO and NiO (2) chromium oxide, expressed as $Cr_2O_3$, in an amount from 0 to <0.06 mole percent of the total moles of $$(SiO_2+Al_2O_3+Na_2O+K_2O)$$

and (3) BaO present in the total glass composition in an amount (a) from 0 to 2 weight percent thereof when the glass composition contains less than 27 weight percent $Al_2O_3$ and (b) from 0 to <0.5 percent of the total glass composition when the glass composition contains as much as 27 weight percent $Al_2O_3$.

References Cited

UNITED STATES PATENTS

| | | | |
|---|---|---|---|
| 3,146,114 | 8/1964 | Kivlighn | 106—39 |
| 3,201,266 | 8/1966 | MacDowell | 106—52 XR |
| 3,313,609 | 4/1967 | Megles | 106—39 |

FOREIGN PATENTS

| | | |
|---|---|---|
| 6,605,578 | 10/1966 | Netherlands. |

OTHER REFERENCES

Advances in Glass Technology—N.Y., Plenum Press 1962—Paper by Urnes Crystallization Studies of $Na_2O$—$Al_2O_3$—$SiO_2$ Base Glasses pp. 377–381.

HELEN M. McCARTHY, Primary Examiner

U.S. Cl. X.R.

65—33; 106—52

PO-1050
(5/69)

UNITED STATES PATENT OFFICE
CERTIFICATE OF CORRECTION

Patent No. 3,528,828  Dated September 15, 1970

Inventor(s) William Earl Smith

It is certified that error appears in the above-identified patent and that said Letters Patent are hereby corrected as shown below:

Column 5, line 1, "Ka$_2$O" should be --K$_2$O--;

Column 5, line 38, "Al$_2$O" should be --Al$_2$O$_3$--;

Column 8, (In Table III) Example 8, line 7, "2/1,300" should be --2/1,400--;

Column 9, line 47, "20" should be --30--;

SIGNED AND
SEALED
DEC 29 1970

(SEAL)
Attest:

Edward M. Fletcher, Jr.
Attesting Officer

WILLIAM E. SCHUYLER, JR.
Commissioner of Patents